United States Patent [19]

Lackner et al.

[11] Patent Number: 4,791,808
[45] Date of Patent: Dec. 20, 1988

[54] METHOD OF DIAGNOSIS OF MULTI-CYLINDER INTERNAL COMBUSTION ENGINES AND MEANS FOR CARRYING OUT THE METHOD

[75] Inventors: Gerald Lackner, Graz; Karl Simbürger, Kalsdorf, both of Austria

[73] Assignees: AVL Gesellschaft für Verbrennungskraft maschinen und Messtechnik mbH.; Prof.Dr.Dr.h.c. Hans List, both of Austria

[21] Appl. No.: 124,586

[22] Filed: Nov. 24, 1987

[30] Foreign Application Priority Data

Nov. 25, 1986 [AT] Austria ............................ 3151/86

[51] Int. Cl.4 ........................................ G01M 15/00
[52] U.S. Cl. .............................. 73/117.3; 73/119 A
[58] Field of Search .................. 73/117.3, 117.2, 116, 73/119 A

[56] References Cited

U.S. PATENT DOCUMENTS 4,425,791 1/1984 Kling ............................... 73/117.3

FOREIGN PATENT DOCUMENTS 2207789 8/1973 Fed. Rep. of Germany .

Primary Examiner—Jerry W. Myracle
Attorney, Agent, or Firm—Hill, Van Santen, Steadman & Simpson

[57] ABSTRACT

For allocating to the respective cylinders cylinder-specific measured values taken from an internal combustion engine under test with the ignition suppressed the measured values are continuously numbered while the ignition is suppressed. After the suppression of the ignition has ceased the numbering is continued at least until the occurrence of the measured value from a cylinder determined by the ignition, after which, bearing in mind the known firing order of the engine, all the measured values can be allocated to the respective individual cylinders.

22 Claims, 1 Drawing Sheet

METHOD OF DIAGNOSIS OF MULTI-CYLINDER INTERNAL COMBUSTION ENGINES AND MEANS FOR CARRYING OUT THE METHOD

BACKGROUND OF THE INVENTION

1. Field of the Invention

The invention pertains generally to the diagnosis of multi-cylinder engines in which operating characteristics of an engine specific to individual cylinders are measured and, particularly, to a method and apparatus for matching measurements of such characteristics taken during suppression of the ignition system to individual cylinders.

2. Related Art

In the measurement of cylinder-specific operational characteristics or traits of an internal combustion engine there is always the problem that matching of measurements to their respective cylinders requires special steps to obtain clear and unambiguous identification of the cylinders. However, the identification should not require any significant outlay in the preparation and performance of the measurements.

In connection with spark-ignition engines, methods are known for allocating measurements t corresponding cylinders taken with ignition permitted. For example, compression characteristics of engine cylinders may be measured by measuring variations in current draw required of a starter motor to turn over an engine. The measurements are allocated by detecting ignition pulses in a predetermined cylinder and then allocating measurements pursuant to a known firing order.

Another known method, employed particularly in connection with diesel engines, uses marks on rotating parts of crankshafts or camshaft drives for determining ignition top dead center (TDC) of a selected cylinder. Measurements are allocated by noting which cylinder has reached TDC when a measurement is taken.

However, a problem arises with the methods discussed when the measurements are to be carried out with ignition suppressed or where no marks for indicating ignition TDC or similar reference points are present on an engine. Recognition of ignition TDC of cylinders is no longer possible and it is almost impossible to match measurements to cylinders.

In connection with testing of diesel engines, a method and apparatus have been known in which before measurements are taken in which fuel injection is reduced by hand to a point where it is insufficient for ignition to take place in an engine, but where it is sufficient to deliver a detectable injection pulse to a sensor clamped onto a fuel injection pipe of a selected cylinder. However, a drawback often arises in that either partial ignition still occurs or that there is an insufficient injunction pulse to trigger the sensor.

German published application OS No. 2 207189 discloses a method and apparatus in which characteristics are measured starting with any cylinder, stored in accordance with a known firing order and then associated with their respective cylinders. During a first ignition cycle with an ignition coil short-circuited, within the course of a falling edge of a contact breaker pulse, successive peak values of a cylinder-specific operating characteristics waveform are stored in successive locations in an analog store. During a second ignition cycle with the ignition coil switched on, a first peak pulse arising in a predetermined cylinder is fed to a first stage of an appropriately constructed ring counter. During the second cycle, a falling edge of the first ignition pulse is delayed until the end of a third ignition cycle. Starting from a stage of the ring counter marked after the end of the third ignition cycle, the stored measurements are then delivered in sequence through an associated relay selector by means of the ring counter to a circuit programmed in accordance with the known firing order. And thus, the measurements are identifiable with respective cylinders.

However, this method and apparatus have the disadvantage that on the one hand there is required a high outlay for circuits to put them into practice and on the other hand the marking of measurements with the ignition suppressed, requires detection of the contact breaker pulses, which means an additional outlay for detection circuits. Moreover, this method and apparatus cannot be applied to all engines.

SUMMARY OF THE INVENTION

The present invention provides a method and apparatus for matching cylinder operating characteristics measured during ignition suppression and in the absence of ignition TDC marks or the like to respective cylinder without a high outlay for detection circuits. Moreover, the invention is applicable to both spark ignition and diesel engines.

According to the invention, the problem of matching measurements taken during ignition suppression is overcome by numbering such measurements. The numbering is triggered upon ignition suppression by the signal level of the cylinder characteristic waveform. Rises in the waveform above a given level triggers numbering of a measurement. Numbering after suppression of the ignition has ceased is accomplished by continuously determining a signal characteristic of ignition TDC for each cylinder and selecting one cylinder based upon such characteristic to match a measurement taken at ignition TDC for that cylinder. Measurements are then matched to cylinders retrospectively according to a known firing order.

Whether an initially performed numbering of measurement is undertaken with a continuous series of numbers or a repeating sequence corresponding to the number of cylinders in the engine is unimportant. A starting point for numbering is also unimportant, it is simply necessary to ensure that the numbering is carried on long enough until a cylinder is identified via a pulse from an ignition lead sensor or fuel injection pipe sensor with sufficient certainty. Subsequent retrospective identification or association of the measurements with respective cylinders can then be undertaken taking into account the firing order of the engine cylinders. For numbering of measurements taken with ignition suppressed, only connections used for picking up the measurements are necessary.

The instant invention also overcomes problems which may arise when only one cylinder is identified by means of an ignition lead or fuel injection pipe sensors such as loss of a clear retrospective waveform of associated cylinder characteristics after removal of ignition suppression and assumption of normal operation. This problem may occur particularly i connection with engines having a large number of cylinders, since, when suppression of ignition ceases shortly after firing of the selected cylinder, in some circumstances, following cylinders may fire first so that the characteristic waveform of the measured characteristics obtained during ignition suppression will have vanished long before the selected cylinder is again measured and identified due to loss of variations in the starter current. According to the invention, this problem is eliminated with certainty for measurements taken both during and after ignition suppression. Derivation of a signal corresponding to the selected cylinder can be achieved either by observation, by feeding the signal to an evaluation unit or by determining or supervising an additional characteristic for a selected cylinder.

When used in connection with diesel engines, the invention may be arranged so that signals which characterize the instant of ignition TDC in a cylinder are obtained by means of fuel injection sensors, in particular, clamp-on transmitters which clamp on to fuel injection pipes or movement sensors for sensing moving needles in fuel injection nozzles. Thus, performance of a diagnosis method is simplified because use of such sensors is known and is common for various measuring purposes and accordingly no new or additional arrangements or knowledge are required.

An aspect of the invention is an apparatus for carrying out the method of diagnosis described, with an arrangement connected to an engine for measuring cylinder-specific operating characteristics of the engine. In particular, an arrangement is provided for determining the relative compressions of individual cylinders by measuring variations in current consumption of a starter motor including, a unit for suppressing engine ignition at will (for example, a unit for suppressing delivery fuel in a fuel injection pump in a diesel engine) and a unit for evaluating a waveform of a starter motor current. An evaluation unit and an allocation unit connected to it, are constructed in accordance with a further feature of the invention in such a way that the allocation unit comprises a comparator unit for triggering numbering of the measurements (with ignition suppressed). When the measurements are above a given value, the comparator unit issues an appropriate signal and numbering of a measurement is triggered. For each cylinder, an ignition timing sensor gives signals to the evaluating device after suppression of ignition has ceased. One of these sensors, associated with a selected cylinder, delivers signals to the evaluating unit which are distinguishable from those of the other sensors so as to make matching of the measurements to respective cylinders possible.

These ignition TDC sensors, also include, according to a further advantageous feature of the invention, injection sensors of which one associated with a selected cylinder, preferably cylinder number one, is connected to a separate input on the evaluating device. In this way it is ensured that after suppression of ignition has ceased and, accordingly, after more or less rapid cessation of the cylinder-specific amplitude variations in the measured characteristics, it remains possible to continue numbering individual cylinder measurements until a signal from the sensor associated with the selected cylinder is received.

Apart from the above-mentioned possibility of identifying a cylinder measurement by means of receipt of a signal from a sensor associated with a selected cylinder by connecting it to a separate input socket on an evaluating device, the cylinder measurement could obviously also be identified in another way, for example, by clearly distinguishable signal amplitudes or by providing an additional signal pulse from another sensor.

It should be mentioned at this point that individual elements of an apparatus according to the invention could also be realized at least partially in the form of software, insofar as this appears to be advantageous, or in the form of hardware.

These and other objects and aspects will become apparent below by reference to the description of the preferred embodiment and the drawings.

BRIEF DESCRIPTION OF THE DRAWINGS

In the attached drawings.

DESCRIPTION OF THE PREFERRED EMBODIMENT

Figure 1:
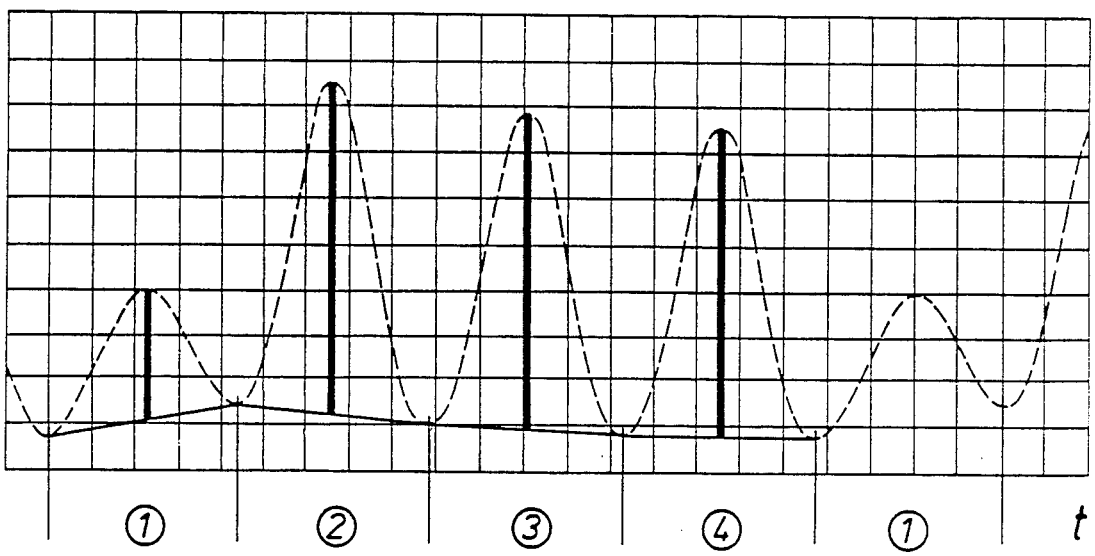
FIG. 1 is a graph including a waveform representing relative compressions of individual cylinders in an engine by showing current draw of a starter motor over time as it attempts to turn over an engine having its ignition suppressed.

In FIG. 1, a waveform of variations in starter motor current of a four cylinder internal combustion engine under test, not illustrated, is graphed. Each segment represents a measurement of an operating characteristic for a specific-cylinder. For the purposes of this description, the words measurements and waveform segments are used interchangeably. Waveform segments are related to cylinders by digits 1-4 set in circles.

As discussed below, the starter motor current waveform is representative of relative cylinder compression characteristics and it can be seen that tee relative compression of the cylinder associated with the segment marked by the circled 1 is well below that of the other cylinders for any of various reasons, which are not of further interest here.

Figure 2:
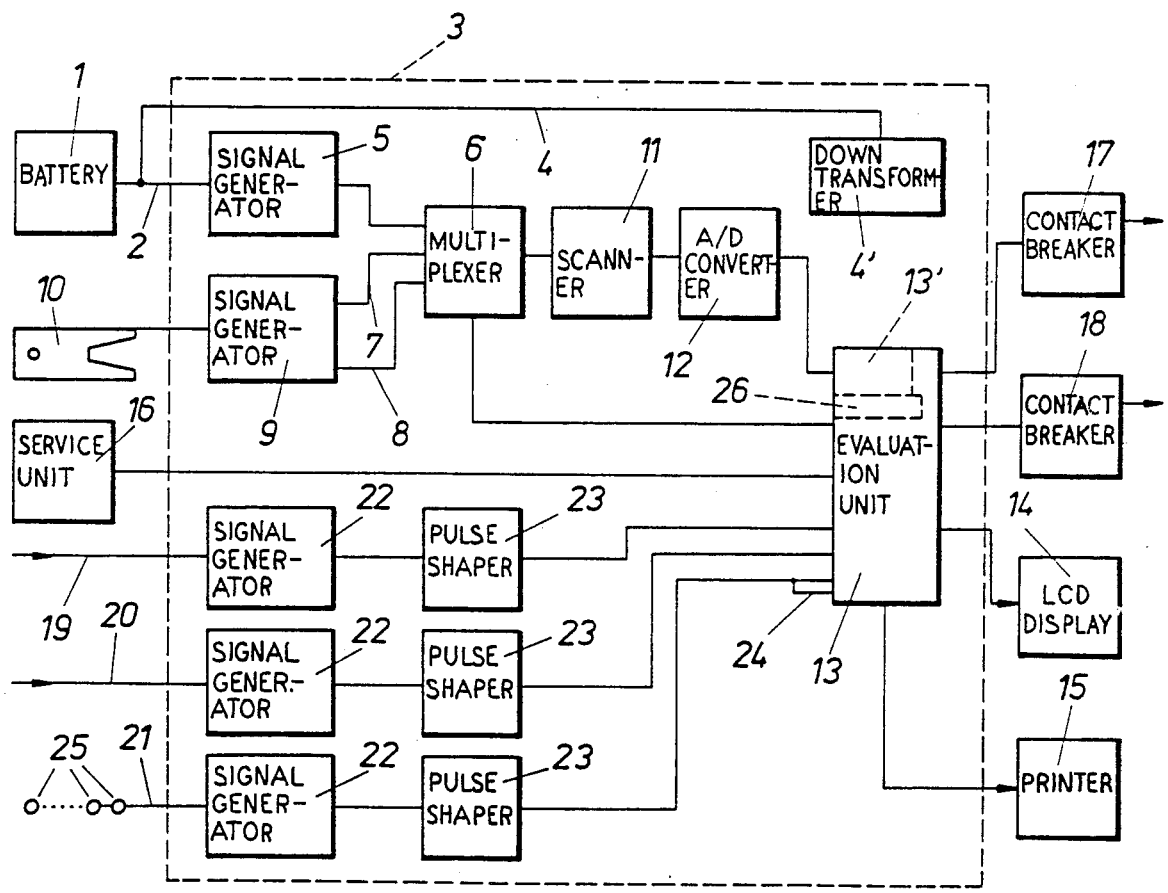
FIG. 2 shows a block diagram of an apparatus embodying principles of the invention.

With reference also to a block circuit diagram of FIG. 2, formation and evaluation of the graph of FIG. 1 will be explained. A starter motor of an internal combustion engine which is to be tested with respect to relative compressions of its individual cylinders is connected to a battery 1 in a manner not illustrated here. The battery 1 is connected through a lead 2 to measuring apparatus 3 which is in turn supplied with voltage by the battery 1 through a unit 4' (e.g., a down transformer) and a lead 4. By means of a signal generator 5, a signal proportional to the battery voltage can be fed to a multiplexer 6. The multiplexer 6 is coupled through leads 7 and 8 to another signal generator 9 which can also be fed with a signal corresponding to the starter current from a tongs-type current pick-up 10. By means of the multiplexer 6 the currently desired signal can be selected, which signal is then fed through a scanning member 11 and an analog to digital converter 12 which follows it, to an evaluation unit 13.

In the embodiment illustrated, the evaluation unit 13—which can be, for example, formed of a microprocessor—also incorporates a correcting unit 13' which allows one to take account of a current/speed characteristic of starter motor and to revise any evaluation in view of errors induced by such characteristic. In this way it is possible to cancel out systematic errors which are observed in such compression measurements, which errors otherwise seriously distort relative differences in compression between individual cylinders and make it more difficult to derive relevant conclusions.

The evaluation unit 13 in the embodiment illustrated also includes a comparator unit 26 incorporating an allocation unit, to be referred to later, for triggering numbering of measurements taken with ignition suppressed. Triggering of numbering occurs every time a measured waveform rises above a given level or value.

Connected to the evaluation unit 13 is an indicator unit 14 (for example, a liquid crystal display) and a printer 15 for displaying the measurements or operating characteristic waveform. In addition to the operating characteristic waveform of individual cylinders of the engine under test, there can be displayed, for example, a starter speed, a mean value of a starter motor current, a mean value of a battery voltage, waviness, et cetera. Also connected to the evaluation unit 13 is a service unit 16 with which different modes of operation of the apparatus or measuring equipment can be controlled as is known to those skilled in the art.

In spark-ignition engines, ignition can be suppressed by means of a unit 17, for example, a contact breaker, activated by an appropriate signal issued by the evaluation unit 13. In an engine, not illustrated, the only extra thing needed is a connection to the contact-breaker terminal.

To suppress injection of fuel in diesel engines, a magnetic valve of an injection pump can shut off by a unit 18. For example, in an engine under test, a control lead to a magnetic valve can be cut and unit 18 interposed to act as a circuit breaker.

For identifying cylinders, that is to say, for allocating cylinder-specific measurements, picked up as shown in FIG. 1, to actual cylinders which give rise to them, the evaluation unit 1,, in the case of a spark-ignition engine under test, can be fed with signals from a capacitive sensor, not illustrated, through a wire 19, after ignition suppression is ceased. Such a sensor is clamped to an ignition lead of a selected cylinder.

In engines which already have marks provided for the introduction of timing sensors, one such sensor can be connected to the evaluation unit 13 through a lead 20 to permit identification of a cylinder, for example, in conjunction with a clamp-on sensor on a fuel injection pipe.

In the case of measurements taken on diesel engines having no timing marks or timing sensors, for identifying cylinder measurements, sensors 25, illustrated diagrammatically, may be clamped onto fuel injection pipes of the engine under test to detect the dilation of the pipes during an injection cycle. Signals from sensors 25 may then be fed, after appropriate shaping, to the evaluating unit 13 via common lead 21. In place of the above-mentioned clamped-on sensors 25, however, inductive or Hall-effect needle movement transmitters could be provided on each cylinder. What is important is that the sensors 25 of the cylinders connected through terminal 21 give signals which are characteristic of their ignition timing. One of these sensors 25 connected to the lead 21 and which is associated with a selected cylinder—usually the number one cylinder—is so constructed and connected that it delivers a signal which can be distinguished in the evaluating unit from those from other sensors. For example, this can be achieved by arranging that this distinctive sensor 25 is connected to a separate input socket—indicated as lead 24—in the evaluating unit 13. The sensors 25 together with the lead 21, the signal generator 22 and pulse shaper 23 form an allocation unit which was already referred to in connection with the discussion of comparator unit 26 and which also belongs to the allocation unit, and this allocation unit is connected to the evaluating unit 13 or is partially integrated into it. In the manner described, the allocation unit allows the measured values to be allocated to the respective cylinders.

The course of the measuring process with the apparatus illustrated and described will now be described briefly. Ignition in an engine under test (not shown) is suppressed by a unit 17 or a unit 18, according to the engine type. Insofar as this is not possible, for example in diesel engines, an adjustment to zero delivery of fuel can be performed by hand. During a subsequent starting process, after the starter motor has reached a steady speed, either the starter motor current i, as illustrated in FIG. 1, or, alternatively, the battery voltage of the battery supplying the current, is measured, and simultaneously, in response to signals of the comparator unit 26 the amplitudes of the waves which arise are numbered. A trigger signal is emitted by the comparator 26 whenever it detects a rising measurement waveform upon comparing the measurement waveform to a preselected value. As soon as a sufficient number of cycles have been scanned for evaluation, suppression of the ignition is caused to cease by a command signal from evaluating unit 13 and then, sensors associated with the engine cylinders for indicating ignition TDC, e.g., sensors 25, emit their respective signals associated with the ignition TDC timing. With these signals, the numbering of the amplitudes associated with the individual cylinders is continued until the transmission and receipt of a signal from that sensor which is associated with a selected cylinder. Then, knowing the number of cylinders and the firing order, the current amplitudes which have been measured and displayed are allocated retrospectively to the individual cylinders.

The specific correlation or matching of cylinders with respective measurements may be done by hand using a printout having an operating characteristic waveform graphed thereon and numbers printed below each waveform segment as triggered by the comparator unit 26. A visual inspection of the printout will show that ignition TDC was recognized in a preselected cylinder (a waveform segment being marked to so indicate) and that the waveform segment corresponding to such cylinder has below it a number. Then, knowing the firing order, the other segments may be associated with a cylinder as well.

While a preferred embodiment has been described, modification may be apparent to those skilled in the art which fall within the scope and spirit of the invention. It is intended that such modifications also be covered by the attached claims.

We claim:
1. A method, comprising the following steps:
suppressing ignition of a multi-cylinder internal combustion engine;
obtaining measurements of cylinder-specific operating characteristics of said engine;
numbering said measurements;
ceasing suppression of said ignition; and
identifying said measurements with respective cylinders.
2. A method as set forth in claim 1, wherein said measurements are obtained both during and after suppression of said ignition.
3. A method as set forth in claim 2, wherein said numbering of said measurements commences during suppression of said ignition in response to triggering by rising signal levels in a waveform representative of said cylinder-specific operating characteristics.

4. A method as set forth in claim 3, wherein said numbering is continuous and continues after ceasation of suppression of said ignition until a signal indicating ignition top dead center in a pre-selected cylinder is received.

5. A method as set forth in claim 4, wherein said measurements are identified retrospectively with respective cylinders according to a known firing order commencing with a measurement taken simultaneously with receipt of said ignition top dead center detection signal of said pre-selected cylinder.

6. A method as set forth in claim 5, wherein said measurements are obtained by measuring an electrical characteristic of a starter motor used to turn over said engine.

7. A method as set forth in claim 6, wherein said electrical characteristic of said starter motor includes current drawn by said motor.

8. A method as set forth in claim 6 wherein said electrical characteristic of said motor includes voltage fluctuations across a battery supplying current to said motor.

9. A method as set forth in claim 6, wherein said signal indicating ignition top dead center in a pre-selected cylinder includes a capacitive sensor signal.

10. A method as set forth in claim 6, wherein said signal indicating ignition top dead center in a pre-selected cylinder includes a clamp-on transmitter for detecting fuel injection in a diesel engine.

11. An apparatus, comprising:
    means for obtaining measurements of cylinder-specific operating characteristics of a multicylinder internal combustion engine;
    means for receiving and evaluating such measurements;
    means for numbering said measurements;
    means for identifying ignition top dead center in a cylinder coupled to said means for evaluating said measurements; and
    means for identifying said measurements with respective cylinders in response to recognition of ignition top dead center in said cylinder coupled to said means for evaluating said measurements.

12. An apparatus as set forth in claim 11, wherein said means for numbering said measurements includes means for comparing a measurement with a pre-selected value for triggering of said numbering of said measurement.

13. An apparatus as set forth in claim 12 wherein said means for identifying said measurements with respective cylinders includes means for identifying a last measurement obtained while ignition top dead center is identified in a preselected cylinder by said means for evaluating said measurements and means for retrospectively identifying measurements with respective cylinder according to a known firing order, beginning with said last measurement and allocating measurements backwards according to said numbering.

14. An apparatus comprising:

measurement means for deriving a characteristic signal representative of a cylinder-specific operating characteristic of a multi-cylinder internal conbustion engine, said signal having segments which are associated with individual cylinders and representative of such operating characteristic of said cylinder;

ignition sensor means for recognizing ignition top dead center in a cylinder and for transmitting an ignition top dead center recognition signal; and allocation means for identifying said characteristic signal segments with respective cylinders including,
    means coupled to said measurement means for receiving and numbering characteristic segments as said segments are derived,
    means coupled to said ignition sensor means for receiving said ignition top dead center signal and for associating a characteristic signal segment with a selected cylinder upon simultaneous receipt of said characteristic signal segment and an ignition top dead center signal from said selected cylinder, and
    means for retrospectively matching said characteristic signal segments with respective cylinders according to a known cylinder firing order and said segment numbering.

15. An apparatus as set forth in claim 14, wherein said allocation means includes means for comparing said characteristic signal segments with a selected value to enable recognition of said segments and to trigger numbering of a segment upon recognition of a segment.

16. An apparatus as set forth in claim 14, wherein said measurement means includes means for deriving a signal representative of an electrical operating characteristic of a starter motor used to turn over said engine.

17. An apparatus as set forth in claim 16, further including means for suppressing ignition in said engine coupled to said allocation means and responsive to control signals transmitted therefrom.

18. An apparatus as set forth in claim 14, wherein said ignition sensor means includes a plurality of sensors which sense ignition indicative activity, one sensor mounted on each cylinder, said sensors coupled in serial fashion to said allocation means, and one of said sensors coupled separately to said allocation means.

19. An apparatus as set forth in claim 18, wherein said sensors sense dilation of a pipe feeding fuel to a cylinder.

20. An apparatus as set forth in claim 14, wherein said ignition sensor means includes a timing sensor which senses timing marks on an engine.

21. An apparatus as set forth in claim 14, wherein said ignition sensor means includes a capacitive sensor which senses spark ignition in a cylinder.

22. An apparatus as set forth in claim 14, further including means for displaying said characteristic signal with its segments identified with respective cylinders.

* * * * *